United States Patent Office 3,830,889
Patented Aug. 20, 1974

---

3,830,889
METHOD OF RENDERING STYRENE COPOLYMER POLYBLENDS SELF-EXTINGUISHING
Gary L. Deets, Springfield, and Philip M. Jacobs, Agawam, Mass., assignors to Monsanto Company, St. Louis, Mo.
No Drawing. Filed Aug. 30, 1972, Ser. No. 284,953
Int. Cl. C08f 15/00, 19/00
U.S. Cl. 260—876 R
11 Claims

ABSTRACT OF THE DISCLOSURE

This invention relates to a self-extinguishing styrene copolymer polyblend composition and method for rendering styrene copolymer polyblends self-extinguishing. More particularly, high impact strength polyblend compositions of styrene copolymers are rendered self-extinguishing by blending with a novel grafted chloroprene rubber phase, said compositions are not only self-extinguishing polyblend compositions but have excellent physical and engineering properties.

BACKGROUND OF THE INVENTION

Polymeric materials of the styrene family including polystyrene and its copolymers, impact resistant polystyrene containing dispersed rubber phases as polyblends and more recently impact resistant copolymers and terpolymers of styrene have gained great commercial utility as tough engineering plastics. Such plastics appear as structural parts of appliances, automobiles and housing.

Government codes are requiring that such plastics be flame-retarding and self-extinguishing. The industry has developed many improved grades of such materials, however, with the ever greater need for high performance plastics, most self-extinguishing types have suffered from inadequate physical properties such as toughness and impact strength.

Self-extinguishing plastics have been formulated with various additives which when added in sufficient amounts to produce self-extinguishing properties in the polymer cause the physical properties to be seriously impared.

Flame-proofing materials such as the halogenated aliphatic and aromatic compounds which are compatible with the styrene polymer family of plastics often act as plasticizers and lower the modulus, reducing the tensile strength. Such materials are thought to decompose and provide a halogen gas-phase that inhibits the gas-phase combustion of the plastic or perhaps the initial pyrolysis mechanism.

Certain inorganic compounds, in particular metal oxide compounds when used in combination with the halogenated organic compound, appear to catalyze their decomposition or enter the chain of reactions to form metal halides that are effective flame retardants. Such systems are not predictable in that such combinations lower the melt point of the polymer causing it to pyrolyze more readily, hence, actually increasing flammability. Beyond flammability such combinations have caused the polymer systems to degrade during heat processing or on exposure to light.

Polymeric plasticizers containing halogens such as polyvinyl chloride and chlorinated olefins have been tried to overcome the deficiencies of the lower molecular weight halogenated organic compounds. Such polymeric materials, however, as used in the styrene family of plastics have lowered their heat stability during processing and given lower physical properties particularly lower modulus, heat distortion and impact strength.

The above problems have been overcome in the styrene family of impact polymeric polyblends by the present invention of incorporating a particular novel grafted chloroprene rubber that provides both self-extinguishing properties and superior physical properties such as impact strength and modulus. It has been further discovered that when the novel grafted chloroprene rubber phase is grafted with halogenated monovinylidene aromatic monomers and blended with a rigid polymer phase having halogenated comonomers that the self-extinguishing properties of the polyblend are further enhanced.

SUMMARY OF THE INVENTION

The present invention relates to a monovinylidene aromatic polymer polyblend composition comprising:

A. A polymer of at least one monovinylidene aromatic monomer and an ethylenically unsaturated nitrile monomer wherein said ethylenically unsaturated nitrile monomer moiety constitutes from 0% to about 45% by weight of the said polymer, and B. A grafted chloroprene rubber, said rubber grafted with:

1. at least one monovinylidene aromatic monomer, and
2. an ethylenically unsaturated nitrile monomer wherein said ethylenically unsaturated nitrile monomer moiety constitutes from 0% to about 45% by weight of the total monomers grafted, said grafted chloroprene rubber is present from about 16.5% to 80% by weight of the polyblend providing from about 15% to 40% by weight of chloroprene rubber in the polyblend, and wherein: at least one said monovinyl aromatic monomer provides a halogen chemically combined with said polyblend wherein said halogen is chlorine combined in the amount of at least about 11% by weight or bromine combined at least about 6% by weight.

The present invention also relates to methods for producing self-extinguishing high impact polyblends of the styrene family by blending uniformly a mixture of a monovinylidene aromatic polymer with a grafted chloroprene rubber.

DESCRIPTION OF THE PREFERRED EMBODIMENTS

As employed herein, the term polyblend means a mechanical mixture of incompatible polymers wherein the mixing is carried out in the melt phase with the smaller volume polymer phase being dispersed uniformly in the larger volume polymer phase in the melt and cooled state.

In the present invention the grafted chloroprene rubber phase is dispersed or polyblended into the larger polystyrene or polystyrene copolymer phase by the conventional melt working of a mechanical mixture of the two. Melt working and mixing is conventionally carried out, by those skilled in the art, through extrusion, milling or banburying for example wherein the styrene polymer phase reaches a melt temperature of 400 to 450° F. Other additives may be present in the melt, e.g. anti-oxidants, lubricants and pigments.

Such polystyrene polyblends have the rigidity and modulus of the larger outer polystyrene or polystyrene copolymer phase. The inner grafted chloroprene rubber phase exists as small rubber particles that provide the polyblend with much higher impact strength than the rigid outer polymeric phase can provide as a single phase. Such rubber particles are considered to be stress relieving centers that give the polyblend high impact strength, greater elongation at fail under stress and greater toughness without serious loss of modulus or rigidity in the outer phase.

The grafted chloroprene rubber is a product of polymerization wherein at least one monovinylidene aromatic monomer and/or ethylenically unsaturated nitrile monomers are polymerized in the presence of chloroprene rubber. The polymerization reaction causes the monomers to polymerize as polymer and as copolymer chains attached to the rubber molecule forming a grafted polychloroprene rubber.

The monovinylidene aromatic monomers used in the polymers making up the polyblends of this invention include styrene, aralkylstyrenes, e.g., o-, m-, and p-methylstyrene, -ethylstyrene, -isopropylstyrenes, -butylstyrenes, -tertiary butylstyrenes, various alphalkylstyrenes, e.g. methylstyrenes, ethylstyrenes, various arhalostyrenes, e.g. o-, m, and p-chlorostyrenes, bromostyrenes, fluorstyrenes and mixed isomers thereof; various di, tri, tetra and penta substituted chlorostyrenes, bromostyrenes, fluorstyrenes and mixed isomers of the same and various alpha- and beta-halosubstituted styrenes, e.g. alphachlorostyrenes, alphabromostyrenes, beta-chlorostyrenes, betabromostyrenes and alpha, beta-halosubstituted and the like.

The ethylenically unsaturated nitrile monomers used in the polymers of this invention are e.g. acrylonitrile, methacrylonitrile, ethacrylonitrile, methyl methacrylonitrile and the like with acrylonitrile and methacrylonitrile and the like being preferred.

The chemically combined halogen content of the polyblend must be above a certain level to pass the self-extinguishing tests set by the Underwriter Laboratories. Values of SE–0 to SE–1 by the above test are considered to be self-extinguishing. The present invention provides a method for incorporating the critical amount of halogen in polystyrene polyblends to pass these tests yet provide a polyblend with excellent physical properties such as impact strength and good heat distortion. The novel grafted polychloroprene rubber then has the dual function of providing halogen and toughness to the polyblend. The grafted rubber is further modified having a particular particle size for impact strength and processability providing high gloss on molded articles.

Polychloroprene contains about 40% combined chlorine. The amount of polychloroprene used in the polyblend can range between 15% and 40% preferably 20% to 30% depending on the impact strength needed in the polyblend, however the percentage cannot be lower than 15% as the critical chlorine content needed to provide self extinguishing properties to the polyblend then becomes too low.

Halogen provided by the halogen monovinylidene aromatic monomers can provide self-extinguishing properties to the polyblend. The mechanism is not fully understood, however, such combined halogen has not been found to be as effective as the halogen supplied by the polychloroprene rubber phase. It can be hypothesized that the halogen chemically attached to rubber is less strongly held than halogen attached to the monovinylidene aromatic monomer because of the resonance stabilization of the benzene ring, hence, in burning the chloroprene halogen is more readily available, at least in the early burning of the polymer, to extinguish the burning polymer.

Regardless of theory, for self-extinguishing properties, it has been discovered that at least about 27% by weight chlorine should be chemically combined in the polyblend, of which at least about 6% should be chlorine provided by the polychloroprene rubber phase.

Halogens, such as bromine, have found to be more efficient than chlorine in providing self-extinguishing properties. In particular, bromine supplied by a monovinyl aromatic monomer is twice as effective as chlorine by weight in providing self-extinguishing properties.

Preferably then the chlorine provided by the chloroprene rubber phase can provide from about 6% to about 16% by weight of chemically combined chlorine in the polyblend and the chlorine from the monovinylidene aromatic monomer can provide correspondingly from 21% to 11% by weight of chemically combined chlorine in the polyblend giving a total of about 27% by weight of chlorine found to be needed for providing self-extinguishing grade polymers. If bromine is supplied by the monovinylaromatic monomer then about 11% to 6% by weight should be provided in combination with about 6% to 16% of chlorine from the polychloroprene rubber phase.

The rubber component of the polyblend may be polychloroprene or copolymers of chloroprene and other monomers, e.g. butadiene, acrylonitrile, methacrylonitrile, styrene, arhalostyrene, alphahalostyrenes, aralkylstyrenes, alphaalkylstyrenes, vinyl chloride; or mixtures of polychloroprene and other synthetic or natural rubbers, e.g. polybutadiene, butadiene-styrene coplymer, isoprene, nitrile rubbers, acrylate rubber, butadiene-styrene-acrylonitrile terpolymers, chloroprene-butadiene-styrene terpolymers, chloroprene-butadiene - acrylonitrile terpolymers, halogenated rubbers and the like.

If copolymers of chloroprene are used, the copolymer must contain enough chloroprene to provide the 6% to 16% chlorine to the polymer system through the rubber phase.

Chloroprene rubbers are commercially available as Neoprene from E. I. du Pont de Nemours and Company as solid rubbers or rubbers contained in emulsions. The generally preferred solid rubbers are the Neoprene W types containing no antioxidant, are colorless, have good heat stability for processing and are soluble or dispersible in the monovinylidene aromatic and ethylenically unsaturated nitrile monomers either in combination or singly. A polymerizing mixture of polychloroprene, halostyrene, styrene and acrylonitrile, wherein the rubber is in solution or dispersed in the reacting monomers will polymerize causing the monomers to graft onto the polychloroprene rubber molecules as grafted chains to form an interpolymer or grafted chloroprene rubber. As the polymerization progresses a polymer of halostyrene, styrene and acrylonitrile (SAN) is also formed in the reacting mixture. As the SAN phase becomes larger than the grafted phase the rubber phase will invert to become the internal phase as a dispersed grafted rubber particle in SAN. Under agitation this dispersion becomes a uniform dispersion or polyblend of grafted chloroprene rubber in SAN polymer. Such polyblends have much greater impact strength than the rigid SAN phase alone. In the present invention the grafted chloroprene provides the novel combination of not only improving the impact strength of the larger SAN phase but also causing the SAN polyblend to be flame retardant and self-extinguishing.

If acrylonitrile is not used, then a polymer of styrene and halostyrene is grafted onto the chloroprene rubber and the rigid phase becomes a styrene-halostyrene polymer. In the same manner, styrene may not be used in the polymer and halostyrene, e.g. monochlorostyrene or monobromostyrene grafts are formed on the polychloroprene rubbers and halostyrene polymers form the rigid phase of the polyblend.

The chloroprene rubbers contained in emulsion are readily grafted by dispersing the reacting monomers in the emulsion and grafting such monomers to the rubber much as in the case of the solution polymerization system.

The percent graft is a controlled amount and can be varied from about 10 to 100% depending on the weight average particle size of the rubber and the properties desired. The percent graft is defined as the weight percent of monomers grafted to the rubber particle based on the weight of the rubber, e.g. 100 grams of rubber grafted with 100 grams of monomers has 100% by weight of grafted monomers.

The weight average particle size of the rubber is selected to provide a balance of good physical properties such as impact strength and gloss. In the emulsion polymerization systems a rubber particle size from about 0.01 to 0.30 microns is preferred with about 0.05 to 0.20 microns being most preferred to give the polyblend desirable impact strength and high gloss. Being small in particle size they do not lower molded surface gloss. This size rubber particle is grafted in a preferred range of 10 to 100% by weight with 45 to 65% being most preferred to insure compatibility and insure good gloss. A larger weight average rubber particle with a size of from about 0.40 to 1.5 microns being preferred and from 0.50 to 1.0 microns being most preferred is polyblended with the small rubber particles to further increase the impact strength. The larger rubber particle is grafted in the preferred range of from about 5% to 40% by weight with 10% to 30% being most preferred to insure compatibility and maintain the integrity and particularity of the rubber particle.

Preferably, the polyblend has from about 50% to 97% by weight, most preferred 70% to 90% by weight, of the total weight of the grafted rubber, in the polyblend, in the form of smaller grafted rubber particles and correspondingly and preferably about 3% to 50% by weight, most preferred 10% to 30%, of the larger grafted rubber particles insuring a balance of good gloss and impact strength.

Preferably, the polyblend requires from about 15 to 40% by weight, of chloroprene rubber based on the total polyblend to insure self-extinguishing properties for the combination. The grafted rubber must be present, in the polyblend in an amount of from about 15.6% to 80% by weight, preferably about 16.5% to 60%, of the polyblend considering that the graft level can be from about 10% to 100% by weight of the chloroprene rubber.

Polyblends using grafted chloroprene can also be prepared having good gloss and impact strength by selecting one optimum sized grafted rubber particle rubber than a small and a large rubber particle. This can be accomplished by selecting a rubber particle having a preferred particle size of about 0.4 to 1.0 microns, most preferably about 0.5 to 0.8 microns, and grafting to a higher level preferably from about 10 to 100%, and most preferably from about 15% to 65% by weight based on rubber.

A further refinement of the polyblend system is used to insure good physical properties such as gloss and impact strength. The degree of graft stabilizes the rubber particle insuring its particulate character so that it stays dispersed in the polyblend and does not agglomerate under the heat and shear of melt colloiding and processing. The chloroprene rubber is preferably chemically crosslinked to further maintain this particulate property. The most preferred chloroprene rubbers used in the emulsion graft systems are crosslinked and contain a medium to high gel content being extremely viscous having a Mooney viscosity above at least about 200 (MS–2½ min. 212° F.). These rubber latices are sold by the duPont Company as Neoprene Latices, e.g. Neoprene 842A.

It has been further discovered that high impact, self-extinguishing polyblends using grafted chloroprene rubbers can have their physical properties further enhanced by blending in small amounts of grafted polybutadiene rubbers to increase low temperature impact properties. Chloroprene rubbers have a second order transition temperature (Tg by ASTM Test D–746–52T) of about −40° C. and become brittle as this temperature is approached in use. The polyblends lose impact strength as the polyblend reaches this temperature range because the grafted rubber particles of the polyblend become brittle can no longer absorb stress. Polybutadiene rubbers have a lower $T_g$, in particular, the high cis-type polybutadiene rubbers have a $T_g$ range of from about −50 to −105° C. with a preferred range of from about −75° to −95° C. Such rubbers are grafted with monovinylidene aromatic monomers (e.g. styrene) and/or ethylenically unsaturated nitrile monomers, e.g. acrylonitrile or methacrylonitrile and are functional and compatible with the polyblends of this invention.

It has been discovered that a small amount of grafted crosslinking polybutadiene rubber wherein the rubber is grafted with 50 to 150% by weight of said monomers and provides 0.5% to 5% preferably 1 to 3% by weight of rubber to the total poly-blend giving an impact strength of 1.5 to 7.0 ft. lbs. when blended with the grafted polychloroprene polyblend having a highly grafted chloroprene rubber with a small particle size. The grafted polybutadiene rubber particle has a preferred weight average size of from about 0.7 to 1.5 microns and most preferred 0.8 to 1.2 microns, wherein the polychloroprene rubber particle has a preferred weight average size of from about .05 to 0.20 microns. Such blends have a high gloss, in the range of 50 to 70 by the Hunter Gloss Meter.

The following examples are presented in illustration of the present invention and are not intended in any way to limit the scope or spirit thereof.

TEST PROCEDURES

Underwriter's Laboratory Subject No. 94 Test

Self-extinguishing (S.E.) properties were measured using the above test which is carried out on test specimen 6" x ½" x ⅛" as follows:

The test specimen is supported from the upper end, with longest dimension vertical, by a clamp on a ring stand so that the lower end of the specimen is ⅜" above the top of the burner tube. The burner is then placed remote from the sample, ignited, and adjusted to produce a blue flame ¾" in height.

The test flame is placed centrally under the lower end of the test specimen and allowed to remain for 10 seconds. The test flame is then withdrawn, and the duration of flaming or glowing combustion of the specimen noted. If flaming or glowing combustion of the specimen ceases within 30 seconds after removal of the test flame, the test flame is again placed under the specimen for 10 seconds immediately after flaming or glowing combustion of the specimen stops. The test flame is again withdrawn, and the duration of flaming or glowing combustion of the specimen noted.

If the specimen drips flaming particles or droplets while burning in this test, these dripping shall be allowed to fall onto a horizontal layer of cotton fibers (untreated surgical cotton) placed one foot below the test specimen. Significantly flaming particles are considered to be those capable of igniting the cotton fibers.

The duration of flaming or glowing combustion of vertical specimens after application of the test flame, average of three specimens (6 flame applications) shall not exceed 25 seconds (maximum not more than 30 seconds) and the portion of the specimen outside the clamp shall not be completely burned in the test.

Materials which comply with the above requirements and do not drip any flaming particles or droplets during the burning test will classify as "self-extinguishing, Class I."

Materials which comply with the above requirements, but drip flaming particles or droplets which burn only briefly during the test will classify as "self-extinguishing Class II."

Class SE–0 is given to materials wherein the duration of flaming or glowing combustion averages less than 5 seconds under the conditions above.

Flammability of Plastics Using the Oxygen Index Method

ASTM Test D–2863 is used with the General Electric Flammability Index Tester Model A–4990–A. A sample bar ⅛" x ½" x 5" is molded and placed in the above tester. The tester is attached to an oxygen tank and a nitrogen tank. By means of control valves, an atmosphere can be created inside the tester containing any desired ratio of nitrogen to oxygen. The lower the oxygen concentration which will support combustion, the higher the degree of flammability of the test specimen. It is generally considered that the oxygen content should be at least 20% for combustion support in order for a material to be considered sufficiently flame resistant. Of course, the higher the value, the better. A propane torch flame is applied to one end of the test specimen in the tester. If the specimen burns for at least three minutes, the concentration of oxygen is reduced. By a system of trial and error with several specimens the limiting oxygen concentration is determined where burning will just be supported for at least three minutes, but will not be supported at an oxygen concentration 1% lower. This limiting concentration is then reported as the Limiting Oxygen Index (LOI).

Weight Average Particle Size Test

The weight average particle size is determined by dispersing the polyblend in dimethylformamide using 2 grams of polyblend in 98 grams of solvent. The dispersion is then diluted 3 to 1 with methyl-ethyl-ketone and analyzed according to the published procedure of Groves, M. J., Kaye, B. H., Scarlett, B., "Size Analysis of Sub-sieve Powders Using A centrifugal Photosedimentometer," British Chemical Engineering, Vol. 9:742–744 (1964). A model 3000 Particle Size Analyzer available from Martin Sweets Company, 3131 West Market Street, Louisville, Ky. was used.

Impact Strength Test

ASTM Test D–256—Method A commonly known as the Izod Test. Impact values are a measure of toughness and high values are needed for engineering applications preferably greater than 1.5 ft. lbs./in.

Heat Distortion Temperature Under Load

ASTM Test D–648 was used with a load of 264 p.s.i. Test values here should remain high so that the polyblend is functional at high temperatures in engineering applications, e.g. automotive and appliances.

Graft Level Test

Weigh out 1 gram of grafted resin and disperse in 20 ml. of a solvent of 50/50 dimethylformamide/methyl ethyl ketone. The matrix polymer will dissolve. Centrifuge and decant off the solvent. Repeat the process three times and dry the grafted rubber under vacuum and weigh.

Percent Graft=wgt. of grafted rubber—wgt. of rubber×100 wgt. of rubber

Sample Preparation

The plastic to be tested is usually in comminuted form. A portion of the plastic particles are compression molded at 330–360° F. at 7200 p.s.i. to form a sheet about ⅛" thick. Sample bars are then cut from the molded sheet having dimensions of ⅛" x ½" x 6".

Without further disclosure, it is believed that one skilled in the art can, using the preceding description of the preferred embodiments, utilize the present invention completely. The following examples, therefore, are given to illustrate this invention but not in any way limit its scope.

Samples of self-extinguishing polymers are prepared by the present invention by blending said polymers with a novel grafted polychloroprene rubber forming polyblends. Monovinyl aromatic monomers containing chemically combined halogen are used in the rigid and grafted rubber phases to further enhance the self-extinguishing properties of the polymers. All proportions in the examples expressed as percentages or parts are by weight.

EXAMPLE 1

Control

A typical polyblend of styrene-acrylonitrile copolymer (SAN) containing about 25% AN and a grafted polybutadiene rubber grafted with a 75/25 S/AN ratio of monomer is used. The polyblend containing about 23% rubber and about 77% SAN by weight, is available from the Monsanto Company of St. Louis, Missouri under the trademark Lustran® ABS 740. The impact strength is 3.0 ft.lbs./in at 73° F.; the percentage of oxygen that just supports combustion is 18% (LOI) and will not pass the UL 94 test. Those skilled in the art would recognize that this polyblend has a desirably high impact strength but that it is too low in flame retardancy to be self-extinguishing.

EXAMPLE 2

Monovinylidene Aromatic Monomer-Acrylonitrile Latices

An emulsion SAN copolymer is prepared using the following formulation based on parts per 100 parts of total monomers:

| | |
|---|---|
| Styrene | 84 |
| Acrylonitrile | 16 |
| Water | 116 |
| Potassium Persulfate | 0.005 |
| Terpinoline | 0.003 |
| Rubber Reserve Soap (Emery Industries of Cincinnati, Ohio. Sodium salt of oleic, stearic and palmitic acids) | 0.018 |
| Darvan #1 (Sodium salt of a formaldehyde naphthalene sulfonate sold by Dewey and Almy of Cambridge, Mass.) | 0.005 |

The monomers are dispersed in water containing the soap and Darvan and polymerized at 95° C. under reflux for 3 hours and 45 minutes in the presence of the potassium persulfate and catalyst and the terpinoline modifier under agitation. The emulsion contains 46.3% of SAN polymer in the emulsion.

An emulsion copolymer of ortho-monochlorostyrene and acrylonitrile is prepared by deleting the styrene monomer in the procedure shown above and adding 84 parts of monochlorostyrene. Copolymers of para-monochlorostyrene or copolymers of the mixed isomers of ortho and para-monochlorostyrene may be prepared by the above procedure by substituting said monomers for styrene.

EXAMPLE 3

Monovinylidene Aromatic Monomer Latices

Using the procedures of Example 2, monovinylidene aromatic polymers and copolymers are prepared by substituting styrene monomer for acrylonitrile monomer. The halogenated styrene monomers can be substituted for styrene or acrylonitrile monomers in any proportions desired to provide a given halogen content in the rigid phase of the polyblend. Homopolymers of the halogenated styrene monomers are prepared by the procedure of Example 2 by substituting said monomers for the styrene and acrylonitrile monomers.

EXAMPLE 4

Grafted Chloroprene Latices

Graft chloroprene rubber is prepared by the following procedure:

A reaction mixture of by parts:

| | |
|---|---|
| Chloroprene Rubber (DuPont Latex 842A 50% solids) | 100 |
| Styrene Monomer | 28 |
| Acrylonitrile Monomer | 12 |
| Emulsifying Agent (Dowfax 2A1) (Dowfax 2A1, a sodium salt of an alkyl diphenyl oxide sulfonate sold by Dow Chemical of Midland, Mich.) | 1 |
| Potassium persulfate initiator | 1 |
| Terpinoline Modifier | 0.5 |
| Water | 260 |

The chloroprene latex, water Dowfax and terpinoline are added to a stirred reactor and brought to 85° C. The monomers and initiator are added to the reaction over a period of 2 hours with a final finishing period of 1½ hours to give a latex having a solids level of 35%. The average particle size of the rubber particles in the latex is observed to be about 0.12 microns (weight average based on centrifugal photo sedimentation method). Halogenated styrene monomers can be substituted for styrene and/or acrylonitrile in this procedure.

EXAMPLE 5

Large Chloroprene Particles

The commercially available chloroprene latex of Example 4 has a weight average particle size of 0.12 microns. Larger rubber particles are prepared for grafting by agglomeration. Agglomeration is carried out according to the following procedures using:

|  | Pts. |
|---|---|
| Chloroprene Rubber (DuPont Latex 842A 25% solids) | 100 |
| Emulsifying Agent (Dowfax 241) | .045 |
| Acetic Anhydride | 6 |
| Water | 300 |

Dissolve 6 parts of the acetic anhydride in 60 ml. of water and added to the rubber latex containing the Dowfax. Stir for 30 seconds after addition and let stand 30 minutes. Add 2 pts. of Dowfax to the emulsion to stabilize the emulsion. The average particle size of the rubber particle is observed to be about 0.50 microns (weight average).

The above emulsion is then grafted according to the procedure of Example 4 using varying amounts of terpinoline and catalyst to vary the conversion and percent graft.

EXAMPLE 6

Polyblends

The graft chloroprene rubber latices of Examples 4 and 5 are blended with the polystyrene polymer latices of Examples 2 and 3 to form uniform blends by mixing of the latices. Various proportions of the several latices are used to provide the percent by weight of chloroprene rubber and halogen containing polymers desired in the final blend. After blending the latices they are coagulated using sufficient aluminum sulfate to precipitate the solid polymers which are recovered by filtration. The solid polymers are dried to a free flowing blend of solid particles that are further blended by melt mixing at 425° F. on a mill to form a polyblend and comminuted for test purposes.

An alternative method is used to form polyblends wherein the individual latices are coagulated with sufficient aluminum sulfate to precipitate the solid polymers which are recovered by filtration and dried to free flowing polymers. The monovinylidene aromatic polymers and the grafted chloroprene polymers are then dry blended in the proportions needed to provide the percent by weight of chloroprene rubber and rigid phase polymers in the polyblend. The percent halogen supplied by the rubber and rigid phase is balanced to produce a self-extinguishing polyblend. The dry blends are melt-blended on a mill at 425° F. to form a polyblend and comminuted for test purposes.

POLYBLENDS [3]

| Polyblend—polymeric monomers (wgt. percent) | A | B | C | D | E | F | G |
|---|---|---|---|---|---|---|---|
| Styrene | 67.5 | | | | | 46 | 45 |
| Monochlorostyrene | | 90 | 85 | 45 | 60 | | |
| Monobromostyrene | | | | | | 14 | 35 |
| Acrylonitrile | 22.5 | | | 15 | | | |
| Chloroprene | 10 | 10 | 15 | 40 | 40 | 40 | 40 |
| Chloroprene graft [1] | 5 | 5 | 8 | 20 | 20 | 20 | 10 |
| Chloroprene chlorine [2] | 4 | 4 | 6 | 16 | 16 | 16 | 8 |
| Monovinylidene: Aromatic monomer Chlorine [2] Bromine [2] | 0 | 23 | 21 | 11 | 15 | 6 | 15 |
| Impact strength, ft.-lbs./in. | 0.7 | 0.7 | 1.0 | 5.0 | 4.0 | 4.7 | 1.7 |
| UL 94 test | Fails | Fails | SE-1 | SE-0 | SE-0 | SE-0 | SE-0 |

[1] Chloroprene rubber is a monodisperse rubber having a weight average particle size of about 0.5 microns having about 50% grafted monomers, said monomers being in the same weight percent as the rigid phase.
[2] The halogenated monomers provide the following approximate weight percent halogen by weight of the monomer used in the polyblends:
  (1) Chloroprene—40% chlorine.
  (2) Monochlorostyrene—25% chlorine.
  (3) Monobromostryene—43% bromine.
The polyblend is 100% by weight of all polymers including rigid phase polymers, rubber phase and rubber graft polymers.
[3] See the following:
Polyblend A—Comprises a polyblend wherein 10% by weight of chloroprene rubber grafted with 5% SAN polymer is melt-blended with 85% by weight of an SAN copolymer at 425° F. providing the polyblend with a total of 90% SAN having 67.5% by weight of styrene and 22.5% by weight of acrylonitrile. The styrene and acrylonitrile monomers being polymerized respectively in a ratio of 3:1 by the procedures of Examples 4 and 5. The polyblend is not self-extinguishing at the 10% chloroprene rubber level providing 4% combined chlorine.
Polyblend B—10% polychloroprene grafted with 5% chlorostyrene is blended with 85% of polymonochlorostyrene (PCS) providing polyblend with a total of 90% PCS. The polyblend is fire retarding but not self-extinguishing, as defined by the test, at 4% chloroprene chlorine and 23% PCS chlorine.
Polyblend C—15% polychloroprene grafted with 8% chlorostyrene is blended with 77% PCS providing the polyblend with a total of 85% PCS. The polyblend is self-extinguishing at 6% chloroprene chlorine and 21% PCS chlorine having a test value of SE-1.
Polyblend D—40% polychloroprene grafted with 20% CSAN is blended with 40% CSAN providing polyblend with a total of 60% SAN. The polyblend is self-extinguishing at 16% chloroprene chlorine. and 11% chlorostyrene chlorine have a test value of SE-0.
Polyblend E—40% of polychloroprene grafted with 20% PCS and blended with 40% PCS providing a total of 60% PCS. The polyblend is self-extinguishing at 16% chloroprene chlorine and 15% PCS chlorine.
Polyblend F—40% polychloroprene grafted with 20% styrene-monobromostyrene (BS) comonomers is blended with 60% of a styrene-bromostyrene copolymer (SBS) wherein the S/BS ratio is 46/14 in both the SBS copolymer and the grafted polymer, providing 14% BS with 6% bromine. The polyblend is self-extinguishing at 16% chloroprene chlorine and 6% BS bromine showing monovinylidene aromatic monomer bromine to be about twice as effective as chlorine in fire retardation.
Polyblend G—20% polychloroprene grafted with 10% SBS copolymer is blended with 70% of SBS copolymer wherein the S/BS monomer ratio is 56/44 for the copolymer and the graft polymer. The polyblend is self-extinguishing at a chloroprene chlorine content of 8% by weight and a SBS bromine content of 15 wt. percent.
The impact strength of polyblends C, D, E, F, and G containing 15% to 40% of grafted chloroprene rubber range from 1.0 to 5.0 ft.-lbs./in. which those skilled in the art recognize as being tough polyblends having high utility for commercial uses requiring good engineering properties where generally an impact strength of greater than 1 is required:

EXAMPLE 7

Grafted Polybutadiene

Fourteen parts of a soluble butadiene rubber were dissolved in 26.0 parts of acrylonitrile and 60.0 parts styrene. There were added thereto 0.07 part of a mixture of terbutyl peracetate 0.05 part di-tert-butyl peroxide and stabilizers. The mixture was heated to 100° centigrade with stirring. Terpinolene was added as a chain transfer agent over a period of approximately five hours in an amount of about 0.1 part per hour for approximately five hours, at the end of which time an additional 10.4 parts were added.

At 30.0 percent conversion of the monomers, the partially polymerized syrup was dispersed in 120.0 parts water to which was added 2.0 parts styrene and, as a suspending agent, 0.3 part of an interpolymer of 95.5 mol percent of acrylic acid and 4.5 mol percent of 2-ethylhexylacrylate which has a specific viscosity of about 4.0 as determined in a 1.0 percent solution in water at 25° centigrade. The resulting suspension was stirred and heated to polymerize the remaining monomer, cooled, centrifuged, washed and dried to recover the graft copolymer in the form of small spherical beads. The ratio of superstrate to substrate was about 0.9 to 1.0:1.0, and the particle size was about 0.9 micron.

Seventy grams of beads are milled and melt colloided as in Example 3 with the 930 grams of the final polyblend admixture of Example 3. The final polyblend now contains about 1% of polybutadiene rubber.

EXAMPLE 8

Grafted Polybutadiene Polyblend

A polyblend is prepared by melt-blending 95% by weight of a polyblend of Example 6–G with 5% by weight of a graft polybutadiene of Example 7 at 425° F. The impact strength is measured at 3.5 ft. lbs./in. and the polyblend is self-extinguishing at SE-0. Example 8 demonstrates the procedure of improving the impact strength of self-extinguishing polyblends by the incorporation of a grafted polybutadiene polymer having a larger particle size. Here impact strength is increased greatly with only a minor reduction halogen content of the polyblend maintaining its self-extinguishing properties.

The ethylenically unsaturated nitrile monomers preferred in the present invention have been described. The weight percent of monovinylidene aromatic monomers and ethylenically unsaturated nitrile monomers to be used can be varied consistent with maintaining the already described necessary halogen content in the polyblend as supplied by the monovinylidene aromatic monomers and the chloroprene.

The acrylonitrile monomer provides chemical resistance, rigidity and higher heat resistance to the rigid phase of the polyblend. The halogenated styrene monomers have the same capability and can be substituted for acrylonitrile in the rigid and graft phase of the polyblend. However, the acrylonitrile provides greater light stability to the polyblend than the monovinylidene aromatic monomers and the most preferred polyblend compositions contain the maximum allowable amount consistent with the halogen content needed.

Considering the maximum preferred amount of polychloroprene at about 40% by weight and the preferred minimum monovinylidene aromatic monomer (bromostyrene) at about 14% by weight, the maximum acrylonitrile monomer content in the total polyblend composition can be as high as 46% by weight of the polyblend as contained in the rigid and/or graft phases. The present invention may have present an ethylenically unsaturated nitrile monomer moiety of about 0% to 46% by weight of the polyblend.

Other monomers may be interpolymerized with the monovinylidene aromatic monomers and the ethylenically unsaturated nitriles of the rigid phase already described. The described monomers can also be replaced by such other monomers consistent with maintaining the halogen content of the polyblend as already described. Exemplary of such other monomers are conjugated 1,3 dienes, e.g. butadiene, isoprene, etc.: alpha- or beta-unsaturated monobasic acids or derivatives thereof, e.g. acrylic acid, methyl acrylate, ethyl acrylate, butyl acrylate, 2-ethylhexyl acrylate, methacrylic acid and the corresponding esters thereof: acrylamide, methacrylamide; vinylidene chloride, vinylidene bromide, etc.: vinyl esters such as vinyl acetate, vinyl propionate, etc. dialkyl maleates or fumarates such as dimethyl maleate, diethyl maleate, dibutyl maleate, the corresponding fumarates, etc.

What is claimed is:

1. A polyblend composition comprising:
   A. a polymer of at least one monovinylidene aromatic monomer selected from the group consisting of styrene, chlorostyrene and bromostyrene and mixtures thereof and an ethylenically unsaturated nitrile monomer wherein said ethylenically unsaturated nitrile monomer moiety constitutes from 0% to about 45% by weight of the said polymer, and
   B. a crosslinked chloroprene rubber having a Mooney viscosity of at least 200 MS—2½ min. 212° F., which is grafted with:
      1. at least one monovinylidene aromatic monomer selected from the group consisting of styrene, chlorostyrene and bromostyrene and mixtures thereof, and
      2. an ethylenically unsaturated nitrile monomer wherein said ethylenically unsaturated nitrile monomer moiety constitutes from 0% to about 45% by weight of the total monomers grafted, and wherein said grafted chloroprene rubber is present in amounts of from about 16.5% to 80% by weight of the polyblend providing from about 15% to 40% by weight of chloroprene rubber in the polyblend and wherein
      the polyblend contains at least 11% by weight of chlorine present as chlorostyrene or at least 6% by weight of bromine present as bromostyrene.

2. The composition of Claim 1 having a grafted chloroprene rubber wherein the weight average rubber particle size is about 0.3 to 0.8 microns, being grafted with from about 10% to 100% by weight of said monomers based on the weight of the chloroprene rubber.

3. A composition of Claim 1, wherein said grafted chloroprene rubber comprises a first grafted chloroprene rubber wherein the average graft rubber particle size, based on weight average is from about .05 to 0.20 microns, a second grafted chloroprene rubber wherein the average rubber particle size, based on weight average, is from about 0.40 to 1.50 microns, said first grafted rubber is grafted from about 10 to 100% with said monomers, being present in from about 50.0 to 97.0 percent of the total weight of the first and second grafted rubbers, and said second grafted rubber is grafted from about 5 to 40% with said monomers.

4. The composition of Claim 1, wherein said grafted chloroprene rubber has a rubber moiety comprising chloroprene copolymerized with at least one monomer copolymerizable with said chloroprene.

5. The composition of claim 4, wherein said grafted chloroprene rubber has a rubber moiety comprising chloroprene copolymerized with at least one monomer selected from the group consisting of styrene, acrylonitrile, methacrylonitrile, butadiene or isoprene and mixtures thereof.

6. The composition of Claim 1, wherein about 0.5% to 5% by weight of the total polyblend is a polybutadiene rubber said polybutadiene rubber being grafted with:
   1. at least one monovinylidene aromatic monomer, and
   2. an ethylenically unsaturated nitrile monomer wherein said ethylenically unsaturated nitrile monomer moiety constitutes from 0 to about 90% by weight of the total monomers grafted wherein said grafted polybutadiene rubber having a weight average rubber particle size of from about 0.7 to 1.5 microns is grafted with from about 50% to 150% by weight of said monomers and wherein said grafted chloroprene rubber has a weight average rubber particle size of from .05 to 0.20 microns being present in said polyblend in from about 16.5% to 80% by weight of the polyblend providing from about 15% to 40% by weight of chloroprene rubber in the polyblend.

7. The composition of Claim 6, wherein said monovinylidene aromatic monomer is styrene.

8. The composition of Claim 6, wherein said ethylenically unsaturated nitrile monomer is acrylonitrile.

9. The composition of Claim 6, wherein said polybutadiene rubber is a high-cis polybutadiene rubber having a cis isomer content of about 30% to 90% and a $T_g$ range of from about $-50°$ C. to $-105°$ C.

10. The composition of Claim 6, wherein said polybutadiene rubber is a butadiene copolymer having at least one comonomer selected from the group consisting of styrene, acrylonitrile or methacrylonitrile, and a $T_g$ range of from $-20°$ C. to $-70°$ C.

11. A styrene polymer polyblend composition comprising:

A. a polymer of at least one monovinylidene aromatic monomer selected from the group consisting of styrene, chlorostyrene and bromostyrene and mixtures thereof and an ethylenically unsaturated nitrile monomer wherein said ethylenically unsaturated nitrile monomer moiety constitutes from 0% to about 45% by weight of the said polymer, and B. a crosslinked chloroprene rubber having a Mooney viscosity of at least 200 MS—2½ min. 212° F., which is grafted with:

1. at least one monovinylidene aromatic monomer selected from the group consisting of styrene, chlorostyrene and bromostyrene and mixtures thereof, and 2. an ethylenically unsaturated nitrile monomer wherein said ethylenically unsaturated nitrile monomer moiety constitutes from 0% to about 45% by weight of the total monomers grafted, and wherein said grafted chloroprene rubber comprises a first grafted chloroprene rubber wherein the average graft rubber particle size, based on weight average, is from about 0.5 to 0.20 microns, a second grafted chloroprene rubber wherein the average rubber particle size, based on weight average, is from about 0.40 to 1.50 microns, said first grafted rubber is grafted from about 10 to 100% with said monomers, being present in from about 50.0 to 97.0 percent of the total weight of the first and second grafted rubbers, said second grafted rubber is grafted from about 5 to 50% with said monomers; said grafted rubbers providing about 15% to 40% by weight of chloroprene rubber in the polyblend and wherein the polyblend contains at least 11% by weight of chlorine present as chlorostyrene or at least 6% by weight of bromine present as bromostyrene.

References Cited

UNITED STATES PATENTS

| | | | |
|---|---|---|---|
| 3,725,504 | 4/1973 | Owston | 260—876 R |
| 3,333,025 | 7/1967 | Bader | 260—880 R |

FOREIGN PATENTS

| | | | |
|---|---|---|---|
| 6615290 | 10/1966 | Netherlands | 260—876 |
| 556,625 | 4/1958 | Canada | 260—876 R |

PAUL LIEBERMAN, Primary Examiner

U.S. Cl. X.R.

260—880 R